United States Patent [19]
Pulrang

[11] 3,751,804
[45] Aug. 14, 1973

[54] DEBURRING TOOL
[75] Inventor: Earl J. Pulrang, Seattle, Wash.
[73] Assignee: Roy S. Rubrang, Kent, Wash.
[22] Filed: Mar. 8, 1971
[21] Appl. No.: 121,674

[52] U.S. Cl............ 30/169, 30/280, 90/24 A, D8/98, D8/107
[51] Int. Cl............................. B26b 3/00
[58] Field of Search............ 30/169, 172, 280, 30/295, 296 R, 298, 317, 164.5, 164.7, 164.9, 164.95; 29/97; 90/24 R, 24 A, 24 F; 15/104.04, 105, 136; 16/110 R; D8/98, 107

[56] References Cited
UNITED STATES PATENTS

| | | | |
|---|---|---|---|
| 3,422,533 | 1/1969 | Keller | 30/314 X |
| 3,555,679 | 1/1971 | Sheridan | 30/344 X |
| 1,440,220 | 12/1922 | Hopkes | 76/87 |
| 1,501,749 | 7/1924 | Chizewer | 76/87 |
| 2,238,222 | 4/1941 | Jones | 30/280 |
| 2,114,364 | 4/1938 | Kilbride et al. | 90/24 |
| 2,352,013 | 6/1944 | Roth | 30/295 |
| 2,485,375 | 10/1949 | Flynn | 30/295 |
| 2,178,019 | 10/1939 | Knuteson | 30/169 |

FOREIGN PATENTS OR APPLICATIONS

| | | | |
|---|---|---|---|
| 23,570 | 8/1893 | Great Britain | 30/169 |

*Primary Examiner*—Granville Y. Custer, Jr.
*Attorney*—Robert W. Beach

[57] ABSTRACT

A grip has a tool shank projecting lengthwise from one end which carries a bit having a ring forming an eye with it axis extending transversely of the tool shank through its tip or a pair of skiving disks. The leading edge of the eye ring rim is sharpened to provide a concave arcuate cutting edge to straddle a workpiece ridge. The skiving disks are located in adjacent coplanar relationship to form a saddle slot between them for straddling a work sheet edge which will chamfer its two corner ridges. The upper end of the grip carries a brace rod having a wrist-engaging saddle. The lower grip end carries a guard plate.

12 Claims, 9 Drawing Figures

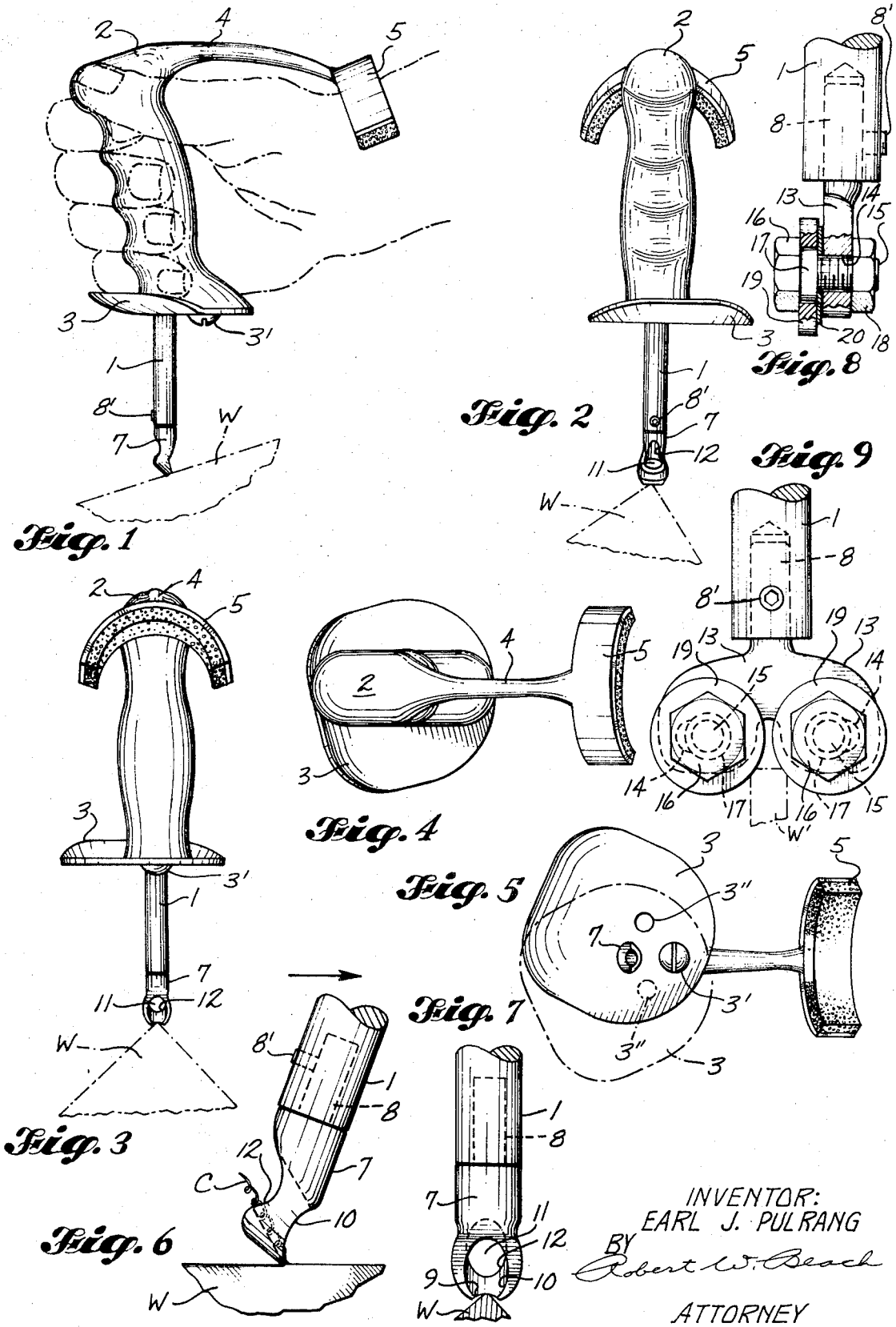

DEBURRING TOOL

A principal object of the invention is to provide a deburring tool which is effective to remove the burr cleanly and quickly from a workpiece ridge or a work sheet edge. A further object is to provide such a tool which can be guided easily to follow such a ridge or edge with minimum tendency to slip off.

Another object is to provide such a hand tool which is comfortable to grasp and can be braced with minimum effort to control the movement of the tool and the pressure applied to it.

A further object is to provide a hand tool which is well balanced and which is constructed to protect both the hand holding the tool and the work from injury if the tool should slip. An incidental object is to provide such a tool which can be converted readily to be grasped by either the right hand or the left hand.

It is also an object to provide a deburring tool which can be sharpened readily.

An additional object is to provide a tool having the capabilities stated above which is compact and light in weight, yet is strong and rugged.

FIG. 1 is a side elevation of the deburring tool having a skiving bit.

FIG. 2 is a rear elevation of the tool, and

FIG. 3 is a front elevation of the tool.

FIG. 4 is a top plan of the tool and

FIG. 5 is a bottom plan of the tool.

FIG. 6 is an enlarged fragmentary side elevation of the working end portion of the tool having a skiving bit, and FIG. 7 is a front elevation of the same portion of the tool.

FIG. 8 is a side elevation of the working end portion of the tool with parts broken away, having a pair of skiving disks, and FIG. 9 is a face elevation of such tool end portion.

To remove burrs from ridges of workpieces which have been cast, forged or machined or from the edges of work sheets which have been sheared or punched has been a vexing problem. It has been customary to remove fins and burrs from such workpieces and work sheets by hand, usually by filing. It has not been practical to mechanize this operation, and the performance of the cleaning job is largely left to the judgment of the individual workman. It is difficult to obtain a cleaning operation of uniform quality. Some workmen are inclined to do an inadequate cleaning job, and others are inclined to take more time than warranted in performing such jobs.

Use of the tool of the present invention tends to promote uniformity of ridges of workpieces and edges of work sheets deburred and to reduce the time and effort of the workman required to perform the cleaning operation. With the tool of the present invention ridges and edges are cleaned by a cutting or skiving operation rather than by a filing or scraping operation. Such operation is particularly effective for workpieces of softer material such as aluminum or plastic, but can be used to advantage for cleaning workpieces of other types of material.

The deburring tool includes a shank 1 which projects lengthwise from one end of a grip 2. Such grip is shaped to be grasped conveniently by a hand shown in phantom in FIG. 1. Such hand is vertically maintained and is protected from injury by a little-finger bearing plate and guard 3 encircling the tool shank. Injury might otherwise occur if the working end of the tool slipped off the workpiece or work sheet when the hand was pressing the shank toward the workpiece or work sheet. Such guard is secured to the grip end by a screw 3'. The guard has in it two holes 3" of a size to fit over the tool shank 1. These holes are located so that when the shank extends through one of these holes maximum bearing surface and protection will be provided to a right hand grasping the grip 2, whereas when the shank extends through the other hole maximum bearing surface and protection will be afforded to a left hand grasping the grip.

By a hand grasping the grip 2 the workman can manipulate the tool shank 1 to press it lengthwise downward and to draw the tool in a direction transversely of the length of the shank toward the workman in opposition to resistance to such movement transmitted to the lower end of the tool shank. In order to draw the tool in this fashion while maintaining it in an upright position in opposition to such resistance, it will be necessary for a workman to exert a pulling force in a direction substantially parallel to the workpiece ridge or work sheet edge and a tilting force on the grip tending to maintain it in upright position to prevent the tool from tilting excessively toward the workman.

The effort required by the workman to maintain the grip 2 in upright position, and consequently the fatigue of the workman, can be reduced greatly by providing brace means reacting from the wrist of the workman and carried by the upper end of the grip. Such brace means is shown as including the brace rod 4 integral with the upper end of the grip and having its length projecting transversely of the length of the grip to provide an angle between the brace means and the grip to receive a hand grasping the grip 2 as indicated in FIG. 1. The grip 2 and brace rod 4 can be cast as an integral unit from aluminum, for example. A saddle 5 of arcuate shape is carried by the end of the brace rod 4 remote from the grip and is of a contour to embrace the thumb side of the workman's wrist, as indicated in FIG. 1. As shown in FIG. 1, the length of such brace rod is at least substantially as great as the length of the grip so as to support the saddle in position for engagement with the user's wrist. To cushion the bearing of the wrist saddle 5 on the wrist, it is preferred that the undersides of the saddle be padded, such as with foam plastic material. The little finger rests on the bearing plate 3 and maintains the hand in a position by which the wrist is easily held in engagement with the brace means.

It is preferred that the tool bit, such as the cutter 7, be separable from the tool shank 1 proper and that such bit have a tang 8 receivable in a socket in the end of the tool shank to form a plug-and-socket connection. The tang can be secured in its socket by a set screw 8' screwed into a hole tapped in the side of the shank tip. By provision of this type of construction the bit can be removed for sharpening if desired, or a dull bit can be replaced by a sharp bit, or a worn bit can be replaced by a new bit, without taking the tool out of service.

The cutter bit 7 shown best in FIGS. 6 and 7 has a cutting edge 9 at its tip, which is formed on the shank end lip portion of the annular leading edge 10 of a substantially cylindrical eye 11 extending through the tip of the bit. The axis of such eye extends transversely of the tool shank 1 and extends through it obliquely from the cutting edge toward the grip so that the trailing edge 12 of the eye is farther than the leading edge 10 from the extreme end of the bit.

The cutting edge 9 is formed by grinding the exterior of the bit end portion of the leading edge rim of the eye 11, as shown best in FIGS. 1 and 7, so that the cutting edge is of concave profile. Such concave arcuate cutting edge is formed by the junction of the substantially cylindrically concave interior surface of eye 11 and the exterior surface of the ring ground at an angle to the axis of such cylindrically concave surface. When the cutting edge of the bit is applied to a ridge of a workpiece W as shown in FIGS. 6 and 7, with the tool shank 1 tilted forward and upward from the cutting edge in the direction of tool movement, such concave arcuate cutting edge is directed outward of a straight line defined by substantially the midpoint of the concave cutting edge and a point of the leading edge opposite the cutting edge, so that the concave edge can straddle the ridge of the workpiece to deter the cutting edge from slipping off the workpiece ridge despite the force exerted in the direction indicated by the arrow in FIG. 6, which moves the cutting edge along the workpiece ridge.

As the cutting edge 9 rides astride of the ridge of the workpiece W, as shown in FIG. 7, the chip C skived from the ridge will pass through the eye 11 as shown in FIG. 6 for disposal without interfering with the cutting action of the cutting edge 9. By exerting substantially uniform pressure lengthwise downward on the shank 1 and by maintaining the angle at which the tool shank 1 is drawn relative to the workpiece ridge, the deburred ridge of the workpiece will be chamfered substantially uniformly to provide not only an effectively cleaned workpiece, but also one having ridges which are substantially uniform whether the ridges are linear, or convex or concave, and irrespective of the sharpness of convex or concave curvature.

For deburring opposite corner ridges of a sheet edge W' a bit having a pair of skiving disks as shown in FIGS. 8 and 9 is more effective than the cutting edge 9 shown in FIGS. 1, 2, 3, 6 and 7. The tang 8 of such bit projects from a flat body having coplanar bifurcations 13. Each of these bifurcations has in it a slot 14 the length of which extends transversely of the length of the tang 8, and the lengths of the slots in the two bifurcations are disposed in alignment. Through each of these slots extends a bolt 15 having a head 16. A shoulder 17 is located between the head and the threaded end of the bolt. Each bolt is secured in its slot 14 by a nut 15 screwed onto its threaded end.

Encircling each shoulder 17 is an annular skiving disk 19 having square edges. Behind each shoulder 17 and disk 18 is a backing or thrust washer 20 which bears against a bifurcation 13. As shown in FIG. 9, the disks 19 are disposed in coplanar side-by-side relationship to form a saddle slot between them for straddling the edge of a workpiece W'. The nuts 18 can be loosened and the bolts 15 shifted toward or away from each other as may be preferred to alter the width of the saddle slot for enabling the edges of disks 19 to engage the corners of the particular work sheet edge most effectively.

The thickness of disks 19 should be slightly less than the axial extent of the shoulders 17 so that the disks can rotate freely. As the tool is used, therefore, fresh square corner portions of the peripheries of disks 19 can be engaged with the work sheet edge to skive its corners most effectively. Ordinarily the tool will be moved in only one direction during a skiving operation, so that a fresh skiving peripheral corner of a disk 19 can be provided by reversing such a disk side for side. When the peripheral corners of a skiving disk have become rounded through use, the disk can be surface ground and/or honed to provide angular peripheral corners on it again.

In normal use the tool shank holding the skiving disk bit shown in FIG. 8 should be moved toward the left as seen in that figure so that the disks will be pressed against their backing washers 20. Any wear resulting from rotation of the skiving disks during use will therefore occur on such disks and on the washers 20, which can be replaced readily, rather than on the bifurcations 13 of the tool bit. It will be evident that the deburring tool can be used very conveniently because it is moved lengthwise along the ridges of a workpiece or edges of a work sheet instead of being moved transversely of such a ridge or edge in any instance. The cutting edge of the cutting tool can follow a workpiece ridge as it changes from straight to concave or convex, and whether the ridge meets another ridge in a salient angle or in a reentrant angle. While a single pass of the tool will effectively deburr a workpiece ridge or a work sheet edge in most instances, it can be passed over the same ridge or edge any number of times desired. Because of the small size of the cutting bit 7 and shank 1 the tool can be inserted into cavities of a workpiece to deburr ridges in such cavities.

I claim:

1. A deburring hand tool comprising a grip, a cantilever shank extending lengthwise from one end of said grip, and skiving means carried by the free end of said shank for deburring a ridge including an eye of substantially cylindrical cross section having its axis extending transversely of the length of said shank and an annular edge defined by the intersection of said eye with an exterior surface of said means, the portion of said edge remote from said grip forming a cutting edge having end portions lying axially outward of said eye from the remainder of the cutting edge and axially outward of a straight line defined by the points of intersection of said annular edge with the axial plane of said eye which extends in the direction of the shank.

2. The tool defined in claim 1, in which the axis of the eye is inclined from the cutting edge end of the eye obliquely away from the free end of the shank.

3. The tool defined in claim 1, and brace means projecting transversely from a portion of the grip spaced from the shank, said brace means being of a length at least substantially as great as the length of the grip and forming an angle with the grip.

4. The tool defined in claim 3, in which the brace means projects from the grip in a direction substantially perpendicular to the length of the grip, and the angle is approximately a right angle.

5. The tool defined in claim 3, in which the brace means includes a rod having its length extending substantially perpendicular to the length of the grip and which rod projects from the end of the grip remote from the shank and a saddle carried by the end portion of said rod remote from the grip and engageable with the wrist of the user.

6. The tool defined in claim 3, and a guard plate projecting from the grip at a location spaced lengthwise of the grip from the brace means for accommodating the hand of the user between the brace means and said guard plate.

7. The tool defined in claim 6, and means for securing the guard plate in different positions turned about the axis of the grip.

8. A deburring hand tool comprising a grip, a cantilever shank extending lengthwise from one end of said grip, skiving means carried by the free end of said shank for deburring a ridge, and brace means projecting transversely from a portion of said grip spaced from said shank, said brace means being of a length at least substantially as great as the length of said grip and forming an angle with said grip to receive a hand grasping said grip.

9. The tool defined in claim 8, in which the brace means projects from the grip in a direction substantially perpendicular to the length of the grip, and the unobstructed angle is approximately a right angle and is unobstructed for the full length of the brace means and the full length of the grip.

10. The tool defined in claim 8, in which the brace means includes a rod having its length extending substantially perpendicular to the length of the grip, which rod projects from the end of the grip remote from the shank, and a saddle carried by the end portion of said rod remote from the grip and engageable with the wrist of the user.

11. The tool defined in claim 8, and a guard plate projecting from the grip at a location spaced lengthwise of the grip from the brace means for accommodating the hand of the user between the brace means and said guard plate.

12. A deburring hand tool comprising a grip, a cantilever shank extending lengthwise from one end of said grip, and skiving means carried by the free end of said shank for deburring a ridge including a ring having an eye with its axis inclined relative to the length of said grip, the intersection of the exterior portion of said ring with the end of the inclined eye farther from said grip forming a concave edge having a central cutting edge portion indented axially of said eye with respect to the end portions of said concave edge, said concave edge being formed around a small portion of the ring periphery, and said end portions being axially outward of a straight line defined by substantially the midpoint of said cutting edge portion and a point of said ring periphery opposite said cutting edge.

* * * * *

UNITED STATES PATENT OFFICE
CERTIFICATE OF CORRECTION

Patent No. 3,751,804      Dated August 14, 1973

Inventor(s) Earl J. Pulrang

It is certified that error appears in the above-identified patent and that said Letters Patent are hereby corrected as shown below:

On the title page, change the assignee's name from "Rubrang" to --Pulrang--.

In the Abstract, line 6, cancel "arcuate".

Column 5, lines 17 and 18, cancel "unobstructed";
lines 18 to 20, cancel "and is unobstructed for the full length of the brace means and the full length of the grip".

Column 6, line 23, cancel "edge." and insert --edge portion.--

Signed and sealed this 18th day of December 1973.

(SEAL)
Attest:

EDWARD M. FLETCHER, JR.
Attesting Officer

RENE D. TEGTMEYER
Acting Commissioner of Patents